United States Patent
Pellaton et al.

(10) Patent No.: US 12,366,165 B2
(45) Date of Patent: Jul. 22, 2025

(54) TURBINE

(71) Applicants: SAFRAN AIRCRAFT ENGINES, Paris (FR); SAFRAN HELICOPTER ENGINES, Bordes (FR)

(72) Inventors: Bertrand Guillaume Robin Pellaton, Moissy-Cramayel (FR); Thibaud Louis Zaia, Moissy-Cramayel (FR)

(73) Assignees: SAFRAN AIRCRAFT ENGINES, Paris (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/278,803

(22) PCT Filed: Feb. 23, 2022

(86) PCT No.: PCT/FR2022/050331
§ 371 (c)(1),
(2) Date: Aug. 24, 2023

(87) PCT Pub. No.: WO2022/180340
PCT Pub. Date: Sep. 1, 2022

(65) Prior Publication Data
US 2024/0151151 A1 May 9, 2024

(30) Foreign Application Priority Data
Feb. 24, 2021 (FR) ........................... 2101803

(51) Int. Cl.
*F01D 5/08* (2006.01)
*F01D 25/12* (2006.01)
(Continued)

(52) U.S. Cl.
CPC ............. *F01D 5/082* (2013.01); *F01D 25/12* (2013.01); *F01D 25/24* (2013.01); *F02C 7/18* (2013.01);
(Continued)

(58) Field of Classification Search
CPC . F01D 5/08; F01D 5/081; F01D 5/082; F01D 5/085; F01D 5/088; F01D 25/12;
(Continued)

(56) References Cited

U.S. PATENT DOCUMENTS

| 8,221,061 B2 * | 7/2012 | Massot | ................... F01D 11/24 415/173.2 |
| 8,631,639 B2 * | 1/2014 | Garcia-Crespo | ........ F01D 5/081 60/39.19 |

(Continued)

FOREIGN PATENT DOCUMENTS

FR          3095231 A1 * 10/2020 ............. F01D 25/12

OTHER PUBLICATIONS

FR-3095231-A1, Oct. 23, 2020, Specification (English Translation), Espacenet (Year: 2020).*

(Continued)

*Primary Examiner* — Brian P Wolcott
(74) *Attorney, Agent, or Firm* — Cozen O'Connor

(57) ABSTRACT

A turbine for a turbomachine of longitudinal axis including an alternating arrangement of annular rows of movable blades and of fixed blades and a radially inner annular cavity formed radially inside the movable and fixed blades, and a supply circuit for supplying cooling air to the inner annular cavity, the downstream end of the supply circuit comprising an inner annular row of orifices and an outer annular row of orifices opening into the radially inner annular cavity. The turbine may also include means for controlling the flow rate of supply air to the orifices of the inner and outer annular rows of orifices.

14 Claims, 3 Drawing Sheets

(51) Int. Cl.
 *F01D 25/24* (2006.01)
 *F02C 7/18* (2006.01)
 *F01D 9/04* (2006.01)

(52) U.S. Cl.
 CPC ...... *F01D 9/041* (2013.01); *F05D 2270/3062* (2013.01)

(58) Field of Classification Search
 CPC ........... F05D 2260/20; F05D 2260/608; F05D 2270/112; F05D 2270/3062; F02C 7/18
 See application file for complete search history.

(56) References Cited

U.S. PATENT DOCUMENTS

| | | | |
|---|---|---|---|
| 10,358,923 B2* | 7/2019 | Takata | F02C 9/28 |
| 10,487,739 B2* | 11/2019 | Miller | F02C 3/10 |
| 2015/0037140 A1* | 2/2015 | Biyani | F16K 31/002 60/516 |

OTHER PUBLICATIONS

International Patent Application No. PCT/FR2022/050331 English translation of International Search Report mailed Feb. 28, 2022, 2 pages.

\* cited by examiner

TURBINE

CROSS-REFERENCE TO RELATED APPLICATIONS

This application is a US National phase Application of International Patent Application No. PCT/FR2022/050331 filed Feb. 23, 2022, which claims priority to FR No. 2101803 filed Feb. 24, 2021, both of which are hereby incorporated in their entireties.

TECHNICAL FIELD

The present disclosure relates to a turbine for a turbomachine. More particularly, the present disclosure relates to cooling of a turbine in an aircraft turbomachine.

BACKGROUND

It is common practice in a turbomachine to take air from an upstream compressor, for example a high-pressure compressor, to cool parts in stages with a warmer environment. The cooling air taken from the high-pressure compressor is for example conveyed to the low-pressure turbine, or to the high-pressure turbine of the turbomachine. The air then purges the warm air and ventilates some parts (e.g. discs, movable blades) of these turbines. This cooling reduces the risk of overheating movable parts of the turbine, which can result in degrading them and, in the worst case, in breaking them.

By way of example, it is possible to make a device comprising several air drawing channels on the high-pressure compressor, these channels ensuring the circulation of the air taken towards the low-pressure turbine or towards the high-pressure turbine in order to cool them. These channels can be dug in a fixed casing of the turbomachine, especially an inter-turbine casing located between the high-pressure turbine and the low-pressure turbine, and providing mechanical connection between the high-pressure turbine casing and the low-pressure turbine casing. The cooling air flowing through these channels then passes through this fixed casing, before being injected into a cavity arranged radially inside the high- or low-pressure turbine, via injectors arranged on a wall of this fixed casing. Document FR3084907A1 describes an example of such a cooling device.

However, although cooling caused by the air injected into the cavity favours thermal protection of the discs, and thus improves the lifetime thereof due to a reduction in the thermal gradient in the rim of each disc, the introduction of cooling air greatly reduces the absolute temperature level of the disc as well as its level of thermal expansion and can lead to an increase in the radial clearance at the vane tip and thus reduce the performance of the turbomachine.

There is therefore a dual need to maintain or improve acceptable operating performance of the turbomachine, and to cool it therewithin.

SUMMARY

Thus, there is provided a turbine for a turbomachine of longitudinal axis, comprising:
 an alternating arrangement of annular rows of movable blades and fixed blades and
 a radially inner annular cavity formed radially inside said movable and fixed blades,
 a supply circuit for supplying cooling air to the inner annular cavity,
 the downstream end of the supply circuit comprising an inner annular row of orifices and an outer annular row of orifices opening into the radially inner annular cavity, the turbine further comprising means for controlling the flow rate of supply air to said orifices of said inner and outer annular rows of orifices.

The inner and outer annular rows of orifices allow the cooled air to open into two different zones of the radially inner annular cavity, namely in a radially inner zone or in a radially outer zone of the cavity, depending on the operating conditions of the turbine. The cooled air, depending on the zone into which it opens in the radially inner annular cavity, thus serves to thermally protect discs and optimise performance of the turbomachine. In particular, the air flow rate control means actively control the radial clearance at the vane tip by regulating the temperature in the radially outer zone of the cavity. The control means thus make it possible to obtain an acceptable compromise between cooling requirement and performance requirement of the turbomachine.

The control means thus inject cooling air that strikes the discs directly or indirectly. The air directly striking the discs will be cooler than the air indirectly striking the discs, due to the heating that the latter undergo on contact with the parts of the cavity through recirculation loops. The control means therefore make it possible to regulate temperature of the cooling air according to the intended operating objective of the turbine.

Also, the control means can include a member for opening/closing the air supply to said orifices, the member being controlled by said control means. There is therefore an active control of the opening/closing member.

Also, the opening/closing member can be a valve. The valve may be a three-way valve.

Also, the three-way valve can be of the on-off type for separately opening the orifices of the inner annular row of orifices and the orifices of the outer annular row of orifices.

Thus, depending on the operating phases of the turbomachine, the valve can open either of its outlet ways so as to favour performance or cooling of the turbomachine. In the operating phase, the valve can, for example, successively close a first outlet way and then a second outlet way so as to obtain a balance between the need for cooling and search of performance of the turbomachine. Furthermore, depending on the open outlet way, the formation of air recirculation loops within the radially inner annular cavity is avoided.

Alternatively to the three-way valve, the opening/closing member can be an assembly comprising a first valve and a second valve, each of the first and second valves being actively controlled independently of each other by the control means, to regulate a flow rate of air passing through the orifices of the inner annular row of orifices and the orifices of the outer annular row of orifices respectively. In this case, in addition to the differentiated opening of each row of injectors provided by the solution offered by the three-way valve, it is possible to regulate the amount of flow rate passing through either of the inner and outer annular rows in order to adapt the desired level of cooling and/or heating.

In one embodiment, the turbine comprises a upstream high-pressure turbine and a downstream low-pressure turbine, the high-pressure turbine and the low-pressure turbine being longitudinally separated by an inter-turbine casing including a plurality of radial arms extending into the annular primary air flow of the turbine, the cooling air supply circuit extending inside a radial arm, the air flow rate control means being arranged in said radial arm.

In another embodiment, the cooling air supply circuit extends through a fixed blade, the air flow rate control means being formed radially inside said fixed blade.

The present disclosure also relates to a turbomachine such as a turbojet or turboprop engine, comprising a turbine as described above.

The present disclosure further relates to an assembly for a turbomachine comprising a turbine as described above, in which the supply circuit is connected at its upstream end to means for taking air from a compressor, for example a high-pressure compressor.

BRIEF DESCRIPTION OF THE DRAWINGS

Further characteristics, details and advantages will become apparent upon reading the detailed description below, and upon analysing the appended drawings, in which.

DETAILED DESCRIPTION

The terms "upstream" and "downstream" are hereinafter defined in relation to the direction of gas flow through a turbomachine, indicated by the arrow F in FIGS. 1 and 2.

Figure 1:
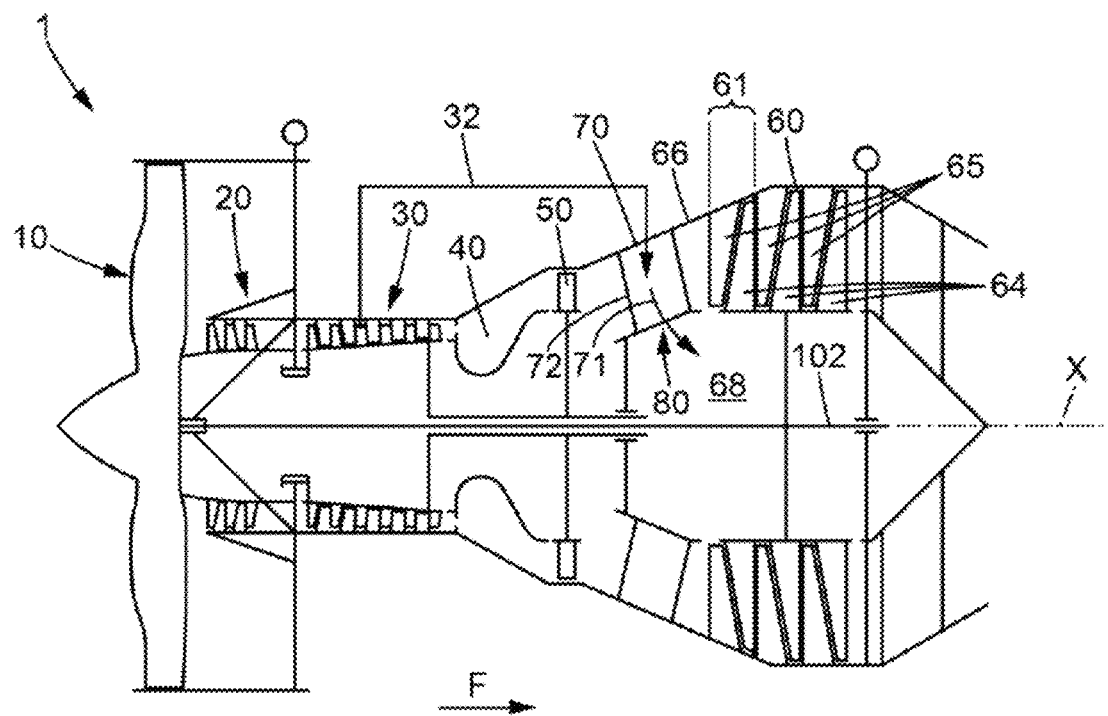
FIG. 1, already described previously, is a schematic cross-section view of a turbine according to the known art.

FIG. 1 illustrates a bypass turbomachine 1 successively comprising, in a known manner, from upstream to downstream at least one fan 10, an engine part comprising, in succession, at least one stage of low-pressure compressor 20, of high-pressure compressor 30, a combustion chamber 40, at least one stage of high-pressure turbine 50 and of low-pressure turbine 60.

Rotors, rotating about the main axis X of the turbomachine 1 and couplable together by different transmission and gear systems, correspond to these different elements.

Furthermore, an inter-turbine casing 70 is disposed between the high-pressure turbine 50 and the low-pressure turbine 60, and mechanically attached to the casing of the high-pressure turbine 50 and to the casing of the low-pressure turbine 60. The inter-turbine casing 70 especially provides support for the bearing that rotatably guides the turbines. To reduce aerodynamic losses, the arms 72 of this casing which pass through the annular stream of primary air enable the air flow to be straightened, in the same way as a distributor stage.

In a known way, a fraction of the air is taken from the high-pressure compressor 30 and is conveyed via one or more cooling air supply circuits 32 in order to cool warmer zones of the turbomachine 1, especially the high-pressure turbine 50 and the low-pressure turbine 60. In particular, the cooling air is conveyed to a cavity inside arm 72 of the hollow inter-turbine casing 70.

The low-pressure turbine 60 illustrated here comprises a plurality of turbine stages 61. Each stage 61 comprises an assembly of fixed distributors 65 and a movable disc 63 (not visible in FIG. 1) to which is mounted an assembly of blades 64, arranged downstream of the distributors 65, and rotatably driven by the movable disc 63.

In the example illustrated in FIG. 1, the inter-turbine casing 70 is attached to the casing 66 of the low-pressure turbine 60. Arm 72 of inter-turbine casing 70 is hollow to allow cooling air to pass therethrough, exiting via an injection device associated with the inter-turbine casing 70, comprising a plurality of injectors 80. The movable discs 63 are rotatably integral with a low-pressure shaft 102 extending along the axis X, while each distributor 65 is connected to the casing 66.

In accordance with the present disclosure, the turbomachine 1 comprises a cooling device for conveying, via the supply circuit 32, the fraction of air taken from the high-pressure compressor 30 to the low-pressure turbine 60. In the example described below, the fraction of cooling air taken is distributed to an upstream stage of the low-pressure turbine 60. The low-pressure turbine 60 is thus cooled. However, the invention is not limited to this embodiment, as the extracted air fraction can also be distributed to other turbine stages.

In the example illustrated in FIG. 1, the fraction of air taken from the high-pressure compressor 30 flows into the supply circuit 32, then into arm 72 of the hollow inter-turbine casing 70. More precisely, the inter-turbine casing 70 comprises a plurality of radial arms extending into the annular primary air flow, the cooling air supply circuit 32 extending inside a radial arm 72 of the plurality of radial arms. The direction of circulation of the air fraction through the inter-turbine casing 70 is illustrated by arrows 71. The air fraction is then injected via the injectors 80 into an annular cavity 68 radially internal to the annular stream of primary air of the turbine, or understream cavity 68. The air distributed is used especially to cool the turbine discs 63. The cooling air injected through orifices 80, or injectors, additionally enables the warm air present in the low-pressure turbine 60 to be purged, thereby cooling it. More precisely, the cooling air taken from the high-pressure compressor 30 and conveyed into the understream cavity 68 forms a pressure barrier, or purge. This pressure barrier prevents warm air coming from the combustion chamber and flowing in the annular primary air flow of the turbine, that is in the primary air circulation stream of the turbomachine 1, from entering the understream cavity 68. Risks of overheating the turbine rotors are thus limited. In particular, by preventing the air from the primary stream from entering the understream cavity 68, this cavity is less warm than the stream, and the turbine rotors can therefore withstand higher centrifugal forces and be sized to lower ultimate stresses.

Figure 2:
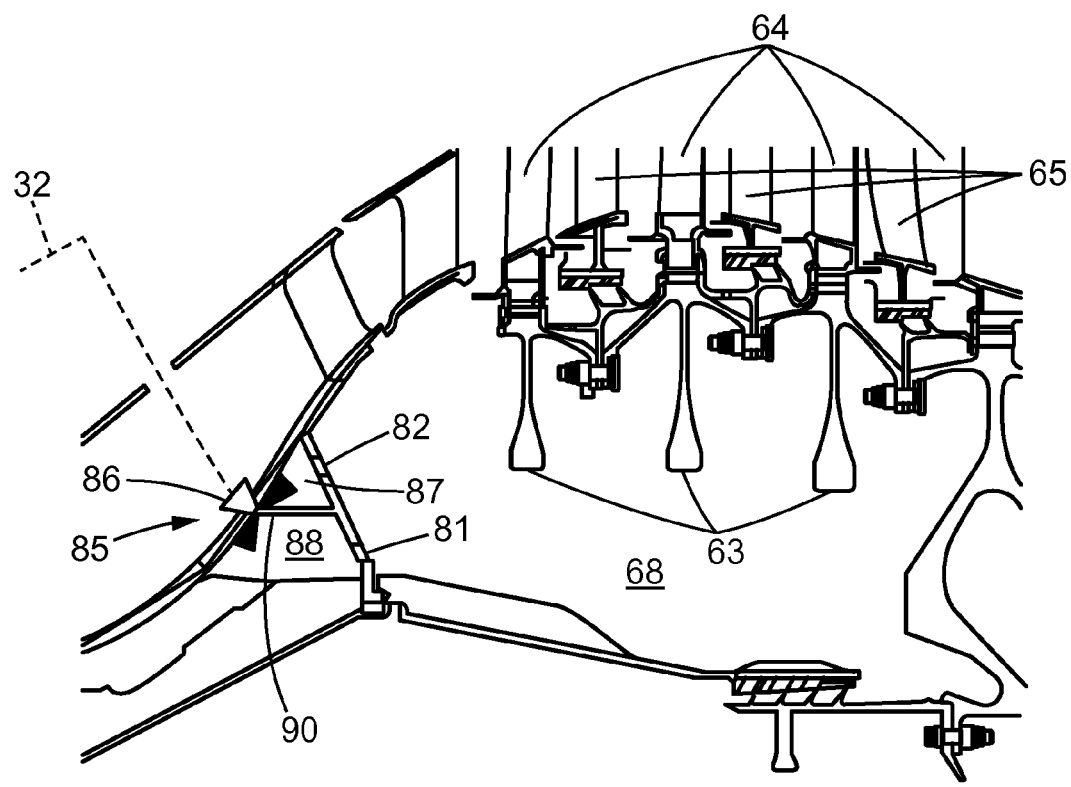
FIG. 2 is a schematic cross-section view of the air flow rate control means according to a first exemplary embodiment.

FIG. 2 is a magnification of a zone of a turbomachine similar to that of FIG. 1, illustrating the upstream part of the low-pressure turbine 60.

The cooling air supply circuit 32 illustrated in FIG. 2 comprises, upstream of the radially inner annular cavity 68, a radially inner upstream annular cavity 88 and a radially outer upstream annular cavity 87. The radially inner upstream annular cavity 88 and the radially outer upstream annular cavity 87 are radially separated by an inter-cavity wall 90. The inter-cavity wall 90 prevents air circulation between the radially inner upstream annular cavity 88 and the radially outer upstream annular cavity 87.

The supply circuit 32 further comprises an inner annular row of orifices 81 and an outer annular row of orifices 82. The orifices 81, 82 open into the radially inner annular cavity 68. In particular, the inner annular row of orifices 81 is arranged between upstream, the radially inner annular cavity 88 and downstream, the radially inner annular cavity 68. Likewise, the outer annular row of orifices 82 is arranged between upstream, the radially outer upstream annular cavity 87 and downstream, the radially inner annular cavity 68.

The radially inner upstream annular cavity 88 and the radially outer upstream annular cavity 87 are thus in fluid communication with the radially inner annular cavity 68, through the orifices 81, 82.

As is visible in FIG. 2, the turbomachine comprises means 85 for controlling the flow rate of supply air to the orifices 81, 82. In this example, the air flow rate control means 85 (not shown) are arranged in radial arm 72 of the inter-turbine casing 70.

Alternatively, according to another example, not illustrated, the turbomachine is free of inter-turbine casing. In this configuration, the cooling air supply circuit 32 extends through a fixed blade, and the air flow rate control means 85 are formed radially inside the fixed blade 65.

The control means 85 make it possible to guide cooling air into the radially inner annular cavity 68. More precisely, the control means 85 guide cooling air into a radially inner or radially outer zone of the radially inner annular cavity 68, according to the intended operating performance of the turbomachine.

To this end, the control means 85 may comprise a member 86 for opening/closing the injectors, or orifices 81, 82. The opening/closing member 86 may consist of one or several valves regulating the air flow through the orifices. The member 86 is actively controlled by the control means 85. By active control, it should be understood that the member 86 is controlled by the control means 85, sending an open/close command to the member 86.

As illustrated in FIG. 2, the member 86 comprises a valve. The valve 86 illustrated is arranged upstream of the radially inner upstream annular cavity 88 and the radially outer upstream annular cavity 87. The valve 86 is, for example, a three-way valve. In particular, the three-way valve 86 allows cooling air to pass from the high-pressure compressor 30 to the radially inner 88 and outer 87 upstream cavities. The valve 86 is of the "on-off" type, that is the valve 86 allows air to pass only through the orifices of the inner annular row of orifices 81 or only through the orifices of the outer annular row of orifices 82.

For example, if cooling of the discs 63 is favoured over the performance of the turbomachine, the valve 86 closes its way opening into the radially inner upstream annular cavity 88 and opens its way opening into the radially outer upstream cavity 87. The cooling air passes through the orifices of the outer annular row of orifices 82 to open into a radially outer zone of the radially inner annular cavity 68. The cooling air thus injected into the radially inner annular cavity 68 directly strikes the discs 63 due to its immediate proximity to the latter. Indeed, the proximity of the orifices of the outer annular row of orifices 82 to the discs 63 prevents the creation of air recirculation loops, these loops being conducive to heating the air. The discs 63 are thus effectively cooled.

In a contrary example, if the performance of the turbomachine is favoured over cooling of the discs 63, the valve 86 closes its way opening into the radially outer upstream annular cavity 87 and opens its way opening into the radially inner upstream annular cavity 88. Cooling air passes through the orifices of the inner annular row of orifices 81 to open in the radially inner position into the radially inner annular cavity 68. Cooling air thus injected into the radially inner annular cavity 68, due to its distance from the discs 63 and the creation of air recirculation loops, tends to warm up before reaching the discs 63.

Air coming from the orifices of the inner annular row of orifices 81 is therefore warmer than air coming from the orifices of the outer annular row of orifices 82. As a result, depending on the operating phases of the turbomachine, the valve 86 can open either of its outlet ways so as to favour the performance or cooling of the turbomachine.

The example of FIG. 2 illustrates that the control means 85 comprise a valve. However, the control means 85 are not limited to a single valve. For example, one or more flapper valves or pistons may be suitable as the member 86.

Figure 3:
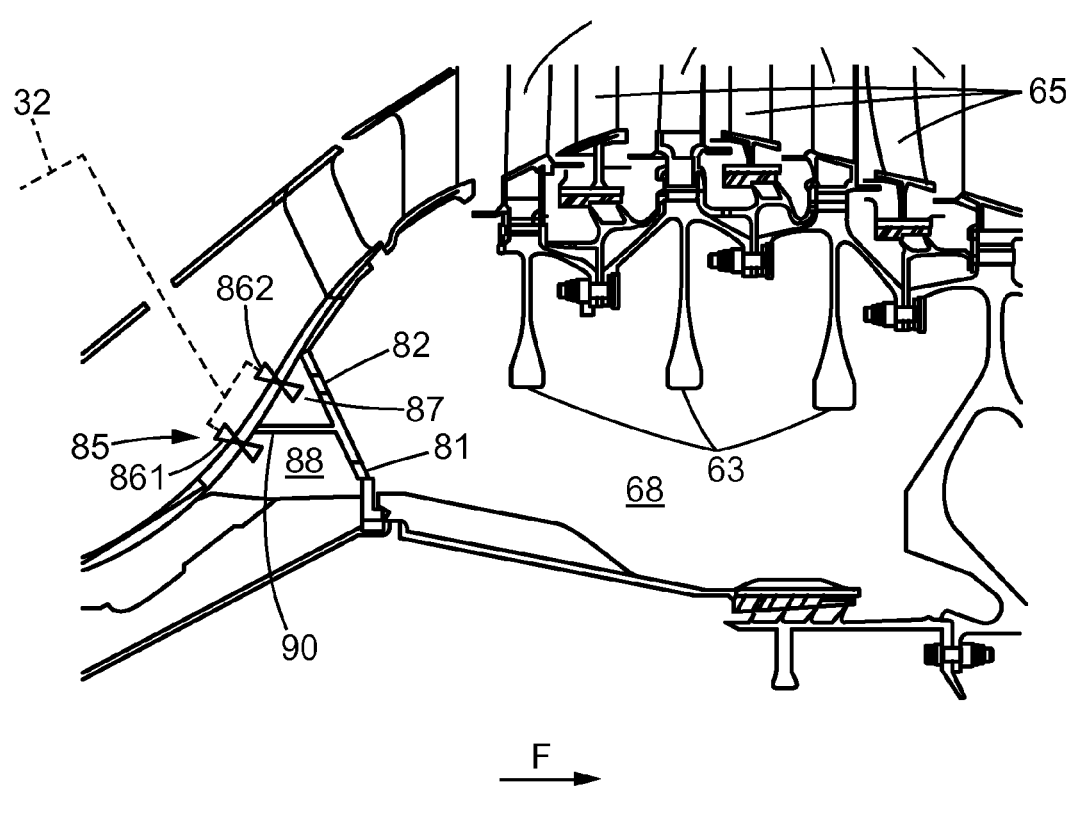
FIG. 3 is a schematic cross-section view of the air flow rate control means according to a second exemplary embodiment.

According to another example, illustrated in FIG. 3 and alternatively to the three-way valve, the opening/closing member 86 can be an assembly comprising a first and a second valve 861, 862, each controlling the orifices of one of the inner and outer annular rows respectively. The valves 861 and 862 may further be actively controlled independently of each other. In this case, in addition to the differentiated opening of each row of orifices, the amount of flow rate passing through either of the rows of orifices can be regulated. In this example, the control means 85 adapt both the desired cooling and heating levels. The valves allow air to pass alternately or simultaneously, and if necessary at different flow rates, through the orifices of the inner annular row of orifices 81 and the orifices of the outer annular row of orifices 82. Cooling air can thus pass through both the orifices of the outer annular row of orifices 82 to open into a radially outer zone of the radially inner annular cavity 68 and the orifices of the inner annular row of orifices 81 to open into a radially inner zone of the radially inner annular cavity 68, so as to simultaneously adapt cooling of the discs 63 and the performance of the turbomachine. In other words, cooling of the radially inner and outer zones of the radially inner annular cavity 68 is regulated by separate active control of each of the zones. The radial clearance at vane tip and the performance of the turbomachine are therefore actively controlled, independently of each other. In this configuration, the valves 861 and 862 can be arranged, for example, upstream of the radially inner 88 and outer 87 upstream cavities, in one of the radial arms of the inter-turbine casing 70.

The invention claimed is:

1. A turbine (1) for a turbomachine of longitudinal axis (X) comprising:
    an alternating arrangement of annular rows of movable blades (64) and fixed blades (65), the movable blades being mounted on discs,
    a radially inner annular cavity (68) formed radially inside said movable and fixed blades (64, 65), the radially inner annular cavity having a radially outer zone around the discs and a radially inner zone,
    a supply circuit (32) for supplying cooling air to the radially inner annular cavity (68) comprising a radially inner upstream annular cavity (88) and a radially outer upstream annular cavity (87) that are radially separated by an inter-cavity wall (90),
    a downstream end of the supply circuit (32) comprising an inner annular row of orifices (81) opening into the radially inner zone of the radially inner annular cavity (68) from the radially inner upstream annular cavity (88) and an outer annular row of orifices (82) opening into the radially outer zone of the radially inner annular cavity (68) from the radially outer upstream annular cavity (87),
    a member (86) to regulate to open and/or close a flow of cooling air from the supply circuit to said inner and outer annular rows of orifices (81, 82),
    wherein the member (86) is a three-way valve, the outer annular row of orifices (82) being positioned such that the flow of cooling air passes into the radially outer zone of the radially inner annular cavity and directly strikes the discs of the turbine, and the inner annular row of orifices (81) being positioned such that the flow of cooling air passes into the radially inner zone of the radially inner annular cavity.

2. The turbine according to claim 1, wherein the member (86) is an on-off type three-way valve for separately opening the inner annular row of orifices (81) and the outer annular row of orifices (82).

3. The turbine according to claim 1, comprising an upstream high-pressure turbine (50) and a downstream low-pressure turbine (60), the high-pressure turbine (50) and the low-pressure turbine (60) being longitudinally separated by an inter-turbine casing (70) including a plurality of radial arms extending into an annular stream of primary air of the turbine, the cooling air supply circuit (32) extending inside a radial arm of the plurality of radial arms.

4. The turbine according to claim 1, wherein the cooling air supply circuit (32) extends through a fixed blade (65).

5. A turbomachine assembly comprising a turbine (1) according to claim 1, wherein the supply circuit (32) is connected at its upstream end to a compressor.

6. A turbomachine comprising a turbine (1) according to claim 1.

7. A turbine (1) for a turbomachine of longitudinal axis (X) comprising:
- an alternating arrangement of annular rows of movable blades (64) and fixed blades (65), the movable blades being mounted on discs,
- a radially inner annular cavity (68) formed radially inside said movable and fixed blades (64, 65), the radially inner annular cavity having a radially outer zone around the discs and a radially inner zone,
- a supply circuit (32) for supplying cooling air to the radially inner annular cavity (68) comprising a radially inner upstream annular cavity (88) and a radially outer upstream annular cavity (87) that are radially separated by an inter-cavity wall (90),
- a downstream end of the supply circuit (32) comprising an inner annular row of orifices (81) opening into the radially inner zone of the radially inner annular cavity (68) from the radially inner upstream annular cavity (88) and an outer annular row of orifices (82) opening into the radially outer zone of the radially inner annular cavity (68) from the radially outer upstream annular cavity (87),
- a member (86) to regulate to open and/or close a flow of cooling air from the supply circuit to said inner and outer annular rows of orifices (81, 82), wherein the member is an assembly comprising a first valve (861) and a second valve (862), each of the first and second valves (861, 862) being independently controlled, in order to regulate a flow rate of cooling air passing through radially inner upstream cavity (88) to the inner annular row of orifices (81) and through radially outer upstream cavity (87) to the outer annular row of orifices (82) respectively, the outer annular row of orifices (82) being positioned such that the flow of cooling air passes into the radially outer zone of the radially inner annular cavity and directly strikes the discs of the turbine and the inner annular row of orifices (81) being positioned such that the flow of cooling air passes into the radially inner zone of the radially inner annular cavity.

8. The turbine according to claim 7, comprising an upstream high-pressure turbine (50) and a downstream low-pressure turbine (60), the high-pressure turbine (50) and the low-pressure turbine (60) being longitudinally separated by an inter-turbine casing (70) including a plurality of radial arms extending into an annular stream of primary air of the turbine, the cooling air supply circuit (32) extending inside a radial arm of the plurality of radial arms.

9. The turbomachine assembly of claim 5, wherein the compressor is a high-pressure compressor (30).

10. A turbomachine comprising a turbomachine assembly according to claim 5.

11. A turbomachine assembly comprising a turbine (1) according to claim 7, wherein the supply circuit (32) is connected at its upstream end to a compressor.

12. A turbomachine comprising a turbine (1) according to claim 7.

13. The turbomachine assembly of claim 11, wherein the compressor is a high-pressure compressor (30).

14. A turbomachine comprising a turbomachine assembly according to claim 11.

\* \* \* \* \*